United States Patent [19]
Chang et al.

[11] Patent Number: 5,979,902
[45] Date of Patent: Nov. 9, 1999

[54] CAVITY SEALING ARTICLE AND METHOD

[75] Inventors: Rong J. Chang, Fremont; Keith Dawes, San Mateo, both of Calif.

[73] Assignee: Raychem Corporation, Menlo Park, Calif.

[21] Appl. No.: 08/925,422

[22] Filed: Sep. 8, 1997

Related U.S. Application Data

[63] Continuation-in-part of application No. 08/805,387, Feb. 24, 1997, abandoned.

[51] Int. Cl.$^6$ ........................................................ F16J 15/14
[52] U.S. Cl. ............................................. 277/316; 277/314
[58] Field of Search ................................... 277/316, 314

[56] References Cited

U.S. PATENT DOCUMENTS

| | | | |
|---|---|---|---|
| 4,166,890 | 9/1979 | Fried et al. | 521/92 |
| 4,203,815 | 5/1980 | Noda et al. | 204/159.2 |
| 4,874,650 | 10/1989 | Kitoh et al. | 428/68 |
| 4,898,630 | 2/1990 | Kitoh et al. | 156/79 |
| 4,989,913 | 2/1991 | Moore | 296/205 |
| 5,040,803 | 8/1991 | Cieslik et al. | 277/316 |
| 5,091,435 | 2/1992 | Suzuki et al. | 521/134 |
| 5,160,465 | 11/1992 | Soderberg | 264/46.5 |
| 5,194,199 | 3/1993 | Thum | 264/46.6 |
| 5,212,208 | 5/1993 | Soderberg | 521/96 |
| 5,213,391 | 5/1993 | Takagi | 296/205 |
| 5,266,133 | 11/1993 | Hanley et al. | 156/71 |
| 5,373,027 | 12/1994 | Hanley et al. | 521/84.1 |
| 5,385,951 | 1/1995 | Soderberg | 521/98 |
| 5,506,025 | 4/1996 | Otto et al. | 428/98 |
| 5,529,824 | 6/1996 | Walendy et al. | 428/75 |
| 5,631,027 | 5/1997 | Takabatake | 425/4 R |
| 5,642,914 | 7/1997 | Takabatake | 296/187 |
| 5,649,400 | 7/1997 | Miwa | 52/406.1 |
| 5,677,382 | 10/1997 | Tsuji et al. | 525/237 |
| 5,678,826 | 10/1997 | Miller | 277/316 |
| 5,725,272 | 3/1998 | Jones | 296/208 |
| 5,800,896 | 9/1998 | Kobayshi | 428/67 |
| 5,806,915 | 9/1998 | Takabatake | 296/187 |
| 5,806,919 | 9/1998 | Davies | 296/205 |

FOREIGN PATENT DOCUMENTS

| | | | |
|---|---|---|---|
| 0 730 999 A1 | 11/1996 | European Pat. Off. | B50R 13/08 |
| WO 93/11001 | 6/1993 | WIPO | B60R 13/08 |

OTHER PUBLICATIONS

Gettys, "New Concepts in Acoustical Baffles," Interior and Exterior Systems, International Body Engineering (IBE) Conf., pp. 90–93 (1993).

Primary Examiner—James R. Brittain
Assistant Examiner—Lewis Nguyen
Attorney, Agent, or Firm—Yuan Chao; Herbert G. Burkard

[57] ABSTRACT

A cavity sealing article for use in a longitudinally extending cavity defined by cavity walls, the cavity having a cross-section within the cavity walls which is to be sealed at a predetermined location, comprises: (a) a driver comprising a crosslinked foamable polymer, the driver having a size, shape, and expansion ratio on foaming such that, when foamed within the cross-section of the cavity at the predetermined location, it substantially but incompletely occupies the cross-section of the cavity; and (b) a sealer comprising an uncrosslinked foamable polymer in intimate contact with the driver and surrounding the driver in the cross-section of the cavity, the sealer having a size, shape, and expansion ratio on foaming such that, when the cavity sealing article as a whole is foamed, the foamed sealer is forced into intimate and sealing contact with the cavity walls.

19 Claims, 2 Drawing Sheets

CAVITY SEALING ARTICLE AND METHOD

CROSS-REFERENCE TO RELATED APPLICATIONS

This application is a continuation-in-part of our U.S. patent application Ser. No. 08/805,387, filed Feb. 24, 1997 now abandoned; which is incorporated herein by reference.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

This invention relates to sealing articles for cavities, and methods for making and using them. More particularly, this invention relates to sealing articles for channels in automobiles or other land vehicles, boats or other marine vehicles, aircraft or other aerospace vehicles, structures, including land and marine structures, and the like, wherever it is desirable to seal a cavity against the passage of air, moisture, fluids, particulates, and the like. In a particular aspect, this invention relates to the sealing of channels, such as pillars, in the body structure of automobiles and similar vehicles; and the invention will be discussed primarily with respect to that aspect.

During the fabrication of automobiles, trucks, and similar vehicles, many body components present cavities that require sealing to prevent the ingress of moisture and contaminants that can cause corrosion of the body parts. This is especially true with respect to unibody structures, where a heavy frame is replaced by a structurally designed space frame that inherently presents a number of moisture- and contaminant-collecting cavities. These cavities also serve as passages through which road and engine noise and other sounds may be transmitted during normal use of the vehicle. For example, the upright post structure of a vehicle body defining a portion of a window opening presents an elongated cavity that can collect moisture and contaminants and also transmit sounds unless the cavity is at least partially filled with a sealant material that blocks the passage of moisture and debris and that also serves as a baffle for muting sounds that would otherwise be transmitted along the length of the cavity and then radiate into the passenger compartment of the vehicle. There are other irregular cavities in a vehicle body that desirably are sealed to prevent moisture and contaminants from entering that area and being conveyed to other parts of the vehicle body.

Many attempts have been made to seal these cavities; and some techniques and products for this purpose are described in U.S. Pat. Nos. 5,266,133 (Hanley et al.), 5,212,208 and 5,160,465 (Soderberg), 5,040,803 (Cieslik et al.), 4,989,913 (Moore, III), and 4,874,650 (Kitoh et al.), among others. The disclosures of these and other documents referred to throughout this application are incorporated herein by reference.

A currently favored technique in automobile cavity sealing is the use of a heat-activated sealing foam material. Typically, a mass of a material capable of expansion (foaming) at elevated temperatures, i.e. a thermoplastic mixture containing both a heat-activated foaming agent and a heat-activated crosslinking agent, is placed on a tray or other mechanical support, usually made from sheet metal or a molded high temperature thermoplastic, that is capable of being mechanically fastened within the cavity. Because automobile bodies are now typically coated by total immersion in phosphating, rustproofing, electrocoating, and other paint baths to ensure that the interiors of all open cavities are coated, the sealing article (the tray, together with the mass of foamable material), should not fill the cavity cross-section before foaming, so that the coatings may enter the cavity during immersion and drain from it after removal from the bath. As the automobile body is passed through an oven to cure the coating to the metal of the body, the foamable mass expands to fill the cavity cross-section and seal to the walls of the cavity. While this technique has proved generally satisfactory, it suffers from two principal disadvantages. First, because the foam material is not self-supporting during foaming, it is subject to sagging before the foam crosslinks, and therefore requires support. This problem is particularly severe when the axis of the cavity to be sealed is approximately horizontal, so that the foam material (which is perpendicular to the cavity axis) is approximately vertical, and the sagging therefore tends to limit expansion of the foam toward the upper parts of the cavity walls. The tray required to support the foam during expansion and sealing adds to both the weight and cost of the seal. Second, because the foamable material is supported during expansion, interfacial adhesion of the molten foaming material to the support restricts lateral expansion of the foam, so that greater expansion occurs perpendicular to the support (along the longitudinal axis of the cavity rather than towards the cavity walls). As a result, sealing may be incomplete, and a greater amount of foamable material is used in an attempt to ensure adequate sealing, also adding to both the weight and cost of the seal. This problem is particularly severe when the cavity to be sealed is highly irregular in cross-section or has a sharply acute angle, when a considerable excess of foamable material may be used to attempt to ensure that the foam fills the cavity cross-section and penetrates to the vertex of the angle.

It would be desirable to produce a cavity sealing article, especially a sealing article for use in a channel in a land, marine, or aerospace vehicle, such as a pillar in the body structure of an automobile or similar vehicle, that could be prepared readily and inexpensively, would be readily handleable and emplaceable within a cavity to be sealed without requiring special tooling, would be readily activatable by elevating the cavity temperature to such temperatures as are commonly encountered in operations on the vehicle body (e.g. 115° C. to 250° C. for automobile paint ovens), and, on activation, would provide an effective seal against infiltration of air, moisture, other undesirable fluids and particulates, and sound.

BRIEF SUMMARY OF THE INVENTION

In a first aspect, this invention provides a cavity sealing article for use in a longitudinally extending cavity defined by cavity walls, the cavity having a cross-section within the cavity walls which is to be sealed at a predetermined location, the article comprising:

(a) a driver comprising a crosslinked foamable polymer, the driver having a size, shape, and expansion ratio on foaming such that, when foamed within the cross-section of the cavity at the predetermined location, it substantially but incompletely occupies the cross-section of the cavity; and (b) a sealer comprising an uncrosslinked foamable polymer in intimate contact with the driver and surrounding the driver in the cross-section of the cavity, the sealer having a size, shape, and expansion ratio on foaming such that, when the cavity sealing article as a whole is foamed, the foamed sealer is forced into intimate and sealing contact with the cavity walls.

In a second aspect, this invention provides a method of making the cavity sealing article of the invention.

In a third aspect, this invention provides a method of sealing a cavity by use of the cavity sealing article of the invention.

BRIEF DESCRIPTION OF THE DRAWING(S)

Figure 1:
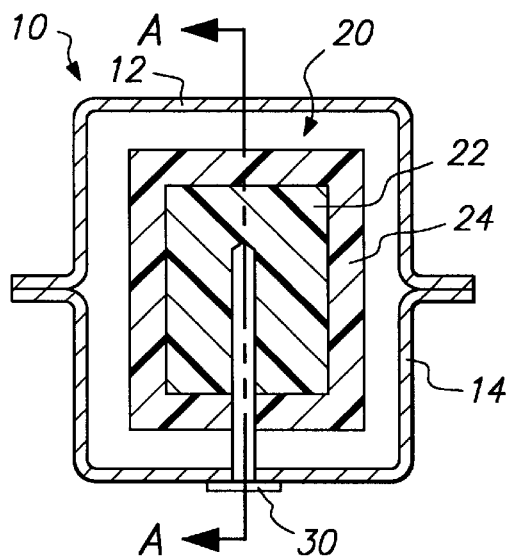
FIG. 1 is a cross-sectional view showing a first embodiment of the cavity sealing article of this invention emplaced within a cavity.
Figure 3:
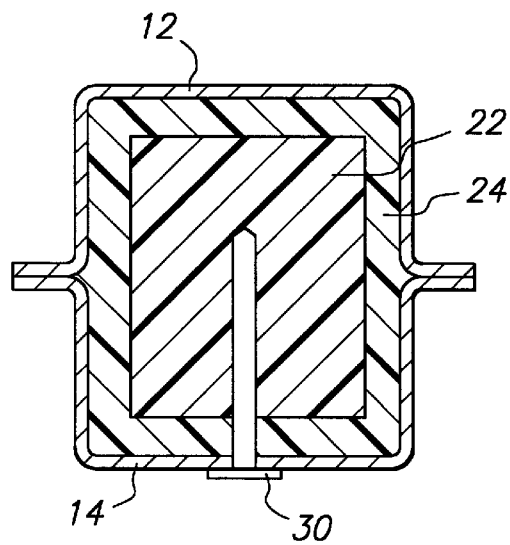

FIG. 3 a cross-sectional view showing the cavity sealing article of FIG. 1 after foaming.

Figure 4:
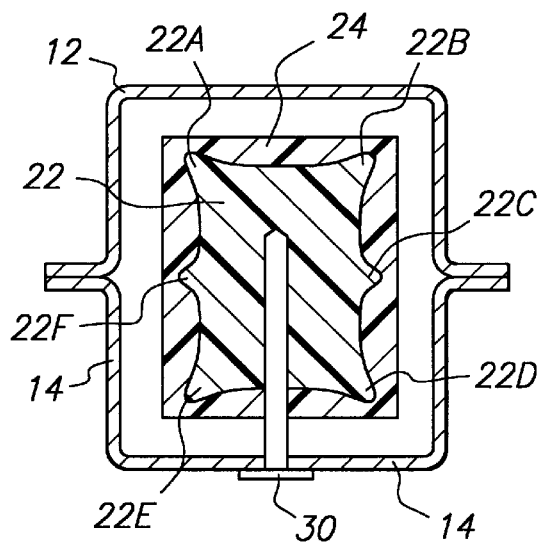

FIG. 4 is a cross-sectional view showing a second embodiment of the cavity sealing article of this invention emplaced within a cavity.

Figure 5:
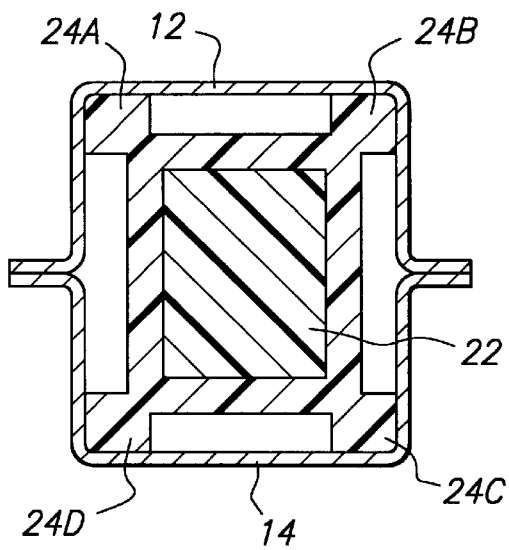

FIG. 5 is a cross-sectional view showing a third embodiment of the cavity sealing article of this invention emplaced within a cavity.

Figure 6:
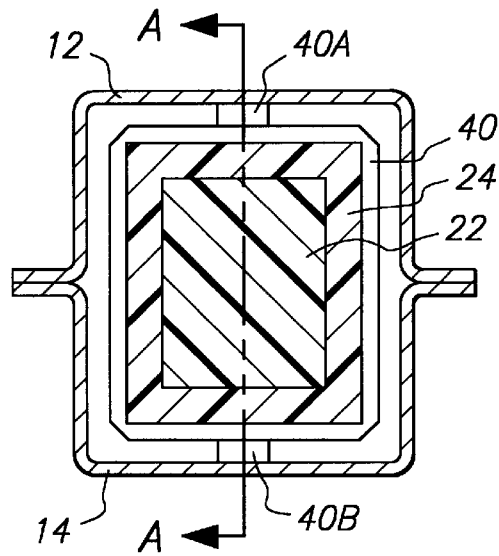

FIG. 6 is a cross-sectional view showing the first embodiment of the cavity sealing article of this invention emplaced upon a support plate within a cavity.

Figure 7:
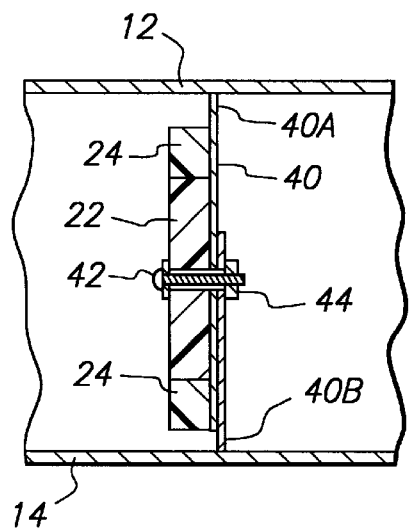

FIG. 7 is a cross-sectional view along line A—A of FIG. 6, parallel to the longitudinal axis of the cavity.

Figure 8:
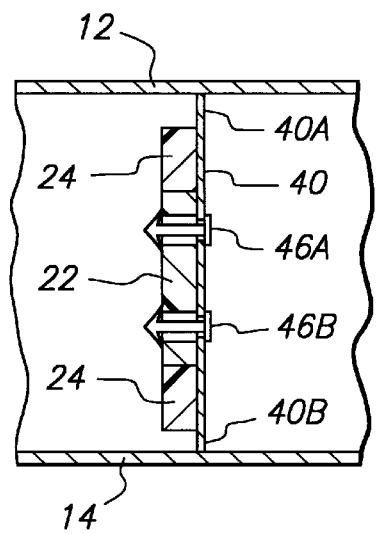

FIG. 8 is a cross-sectional view parallel to the longitudinal axis of the cavity, showing the first embodiment of the cavity sealing article of this invention emplaced on an alternative support plate.

DETAILED DESCRIPTION OF THE INVENTION

Figure 2:
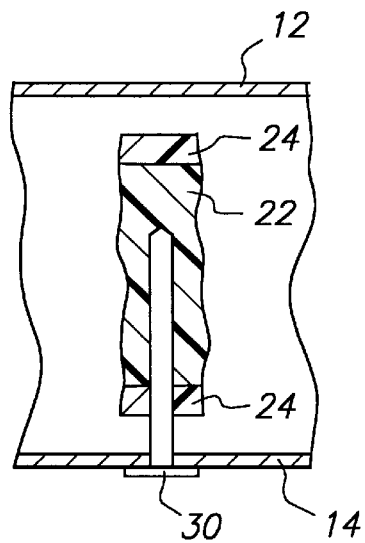
FIG. 2 is a cross-sectional view along line A—A of FIG. 1, parallel to the longitudinal axis of the cavity.

Referring to the Figures, where like numerals denote like elements of the invention, FIG. 1 is a cross-sectional view showing a first embodiment of the cavity sealing article of this invention emplaced within a cavity, the longitudinal axis of which is perpendicular to the page. The axis of the cavity may be oriented in any direction: horizontal, oblique, or vertical; so that the cross-section that is to be sealed may be, correspondingly, vertical, oblique, or horizontal. The cavity shown generally as 10 is defined by a pair of cavity wall forming members 12 and 14 which may be fastened together by any suitable means (not shown). The cavity sealing article shown generally as 20 comprises a crosslinked foamable polymer driver 22 surrounded by and in intimate contact with an uncrosslinked foamable polymer sealer 24. The cavity sealing article 20 is positioned within the cavity 10 by mounting on a stud 30 projecting through one of the cavity walls. FIG. 2 shows the cavity sealing article of FIG. 1 in a further cross-sectional view, where the longitudinal axis of the cavity is parallel to the page. On activation of the article by the application of a sufficient temperature for a sufficient time, the driver 22 foams to expand and force the sealer 24, which also foams and expands, into contact with the cavity walls, thereby sealing the cavity. FIG. 3 shows the cavity sealing article of FIG. 1 after foaming, where the driver 22 has foamed and expanded to more substantially fill the cavity cross-section; and the sealer 24, which has also foamed and expanded, has been forced into sealing contact with the cavity walls.

Composition of the Cavity Sealing Article

Suitable compositions for the cavity sealing article of this invention will be foamable polymer compositions having a foaming temperature appropriate to the temperature range of intended application, for example a foaming temperature within the range of temperatures to be encountered in bake ovens for vehicle bodies, and the like. Such compositions will contain a base polymer and a blowing agent to cause foaming of the polymer. They will typically also contain fillers, antioxidants, flame retardants, and/or other stabilizers such as are conventional in polymeric articles, and may contain pigments, plasticizers, adhesion promoters, activators for the blowing agents, and the like.

The sealer portion of the article (sometimes referred to elsewhere in this application simply as "the sealer") may, and preferably will, contain a chemical crosslinking agent to strengthen the resulting foamed polymer, and may also contain a tackifier to maximize adhesion of the article to the cavity walls on foaming. If the sealer and the driver are not made in a unitary fashion, but are assembled before crosslinking of the driver (for example by comolding or coextrusion of the driver and sealer portions of the article), and the driver is to be crosslinked by radiation, then the sealer may contain an agent chosen to prevent radiation crosslinking (an "anti-rad", for example a free-radical quencher such as an amine) so that the whole article may be irradiated with only the driver being crosslinked by the radiation. The sealer is uncrosslinked before foaming, by which is meant that it is either totally free of crosslinking or has such a low degree of crosslinking that it substantially retains the foaming and adhesive characteristics of an uncrosslinked polymer. Desirably, the sealer becomes crosslinked on foaming, as discussed further later in the application, as this provides additional stability to the foam, but it is within the scope of the invention that the sealer may be uncrosslinked (as defined immediately above) even after foaming.

The driver portion of the article (sometimes referred to elsewhere in this application simply as "the driver"), which is crosslinked, will typically contain either or both of a chemical crosslinking agent and a radiation crosslinking promoter (a "pro-rad") to enhance radiation crosslinking of the driver. Where the driver portion of the article is chemically crosslinked, the crosslinking agent chosen will be one having an activation temperature substantially below the activation temperature of the blowing agent so that the driver may be crosslinked before any foaming occurs. When the driver portion of the article is radiation crosslinked, such as by exposure to electron beam irradiation, the driver portion will typically contain a radiation crosslinking promoter; the amount and type of which may be chosen depending on the polymer composition. When the driver is crosslinked by radiation, the extent of the irradiation will depend on the material of the driver (the polymer, additives, etc.), the type and quantity of radiation crosslinking promoter, the thickness of the article, etc. Typical irradiation dosages for electron beam irradiation will lie between 0.25 and 20 Mrad, preferably between 0.5 and 10 Mrad.

Although it is not required by this invention that the compositions of the foamable polymers of the driver and sealer portions of the article be the same, they should be compatible so that the resulting article provides an optimal seal when the article is used.

It may be convenient for manufacture that the compositions of the foamable polymers of the driver and sealer should be the same; and it may be further convenient that the article should be formed from a single piece of such a foamable polymeric composition. Such a manufacture is discussed further later in this application and in the Examples. In this case, the driver portion of the article will typically be crosslinked by radiation, and the foamable polymeric composition will contain both the chemical crosslinking agent for the sealer and desirably will also contain a radiation crosslinking promoter to enhance radiation crosslinking of the driver.

Suitable base polymers may include a wide range of polymers, typically chosen for a particular application so that the resulting article will foam at a convenient temperature for sealing of the cavity to be sealed and will be stable under intended use conditions. A suitable base polymer or mixture of polymers will thus have a softening point below the desired temperature of foaming in the absence of crosslinking, for example at a temperature at least 50° C. below the desired foaming temperature. The melt index (as measured by ASTM D-1238) of the polymer or mixture of polymers will desirably be from 0.5 to 10, preferably from 3 to 7, and in any event will desirably be chosen to give an appropriate degree of expansion of the resulting cavity sealing article during foaming.

Suitable polymers thus include olefinic polymers such as very low density polyethylene, low density polyethylene, medium density polyethylene, high density polyethylene, polyethylenes or ethylene copolymers prepared by metallocene polymerization (such as Exact [Exxon] and Engage [Dow]), ethylene copolymers such as ethylene-vinyl acetate copolymer, ethylene-methacrylic acid copolymer, ethylene-acrylic acid copolymer, ethylene-butyl acrylate copolymer, ionomers (such as Surlyn [duPont] and Iotek [Exxon]), etheyne terpolymers such as ethylene-vinyl acetate-methacrylic acid copolymer, polypropylene, elastomers such as ethylene-propylene rubber, EPDM, nitrile rubbers, butyl rubbers, chloroprene, chloropolyethylene, polyacrylate elastomers, chlorosulfonated polyethylene, thermoplastic elastomers, and fluoropolymers such as polyvinylidene fluoride, ethylene-tetrafluoroethylene copolymer, fluorinated ethylene-propylene copolymer, poly(chlorotrifluoroethylene), ethylene-chlorotrifluoroethylene copolymer, etc., and mixtures of any two or more of the above.

For example, a suitable polymer or mixture of polymers for use in a cavity sealing article for use in the automobile industry, where bake oven temperatures will be in the range of 115° C. to 250° C., say around 160° C., may have a softening point below about 100° C., preferably below 90° C., in the absence of crosslinking. Such polymers may include ethylene-vinyl acetate copolymer (EVA), ethylene-methyl acrylate copolymer (EMA), and the like, optionally admixed with each other or with such polymers as low density polyethylene and/or ionomers. An exemplary polymer is EVA having a vinyl acetate (VA) content between 5% and 45%, especially between 15 and 35%, particularly between 20% and 30%.

Suitable fillers for the composition of the sealing article include inorganic fillers such as zinc oxide, barium sulfate (Huberbrite), calcium carbonate, magnesium hydroxide, alumina trihydrate, and the like; at a concentration up to about 40 parts per 100 parts of the base polymer.

The blowing agent is chosen so as to effect foaming and expansion of the cavity sealing article at an elevated temperature normally present during the manufacture of the product containing the cavity to be sealed; for example, at a temperature normally present during passage of an automobile body through a paint bake oven (typically 115° C. to 250° C.). Suitable blowing agents will include from 1 to 15 parts per 100 parts of base polymer of an azodicarbonamide or benzenesulfonyl hydrazide. Suitable azodicarbonamide blowing agents include Celogen® AZ 130 or 3990; and suitable modified azodicarbonamide agents include Celogen® 754 or 765, all from Uniroyal Chemical. Suitable benzenesulfonyl hydrazide blowing agents include p,p'-oxybis(benzenesulfonyl hydrazide), sold as Celogen® OT, and p-toluenesulfonyl hydrazide, sold as Celogen® TSH, both also from Uniroyal. The blowing agent may also be made up of a combination of agents depending on the degree of expansion desired for a particular application; and may also include a blowing agent activator such as diethylene glycol, urea, dinitrosopentamethylenetetramine (DNPT), and the like. Certain fillers, such as zinc oxide (Kadox), may also act as activators for the blowing agent. The amount of activator added will depend on the choice of blowing agent and the amount of expansion required.

Flame retardants may also be present, of such kinds and at such concentrations as will provide flame retardancy for the article. These may include halogenated flame retardants such as the polybrominated aromatics (e.g. decabromobiphenyl), and the like, for example in combination with inorganic materials such as antimony trioxide; or may include non-halogenated flame retardants, such as the magnesium hydroxide and alumina trihydrate previously mentioned as fillers.

The chemical crosslinking agent is preferably a free radical crosslinking agent compatible with the base polymer of the article. Preferred chemical crosslinking agents are peroxides, such as bis(t-butylperoxy) diisopropylbenzene, 1,1-di-t-butylperoxy-3,3,5-trimethylcyclohexane, 4,4-di-t-butylperoxy n-butyl valerate (Trigonox), dicumyl peroxide (Dicup), and the like. In most cases, the chemical crosslinking agent is provided at 1 to 5 parts per 100 parts of base polymer.

The blowing agent and the chemical crosslinking agent will be chosen so that the chemical crosslinking agent has an activation temperature approximately that of the blowing agent. For example, it may have an activation temperature slightly below that of the blowing agent, so that the foam maintains stability during expansion,; but desirably the kinetics of the crosslinking and foaming reactions are such that the sealer of the article expands and foams on heating, and adheres to the walls of the cavity, before the resulting foam is completely crosslinked by action of the chemical crosslinking agent. Desirably, the activation temperature of the blowing agent will be chosen so that the blowing agent is not easily accidentally activated (such as by mixing at a temperature above the optimal mixing temperature, during welding or other forming of a cavity in which the sealing article is emplaced, or during phosphating, painting or other coating treatments, or drying of such coatings) but is only activated when it encounters temperatures in which it is desired that the sealing article should foam, such as are present in bake ovens.

The radiation crosslinking promoter may be chosen from among those conventionally used to promote the crosslinking of polymers, such as triallyl cyanurate (TAC), triallyl isocyanurate (TAIC), triallyl trimellitate, triallyl trimesate, tetraallyl pyromellitate, the diallyl ester of 1,1,3-trimethyl-5-carboxy-3-(4-carboxyphenyl)indane, trimethylolpropane trimellitate (TMPTM, Sartomer 350), pentaerythritol trimethacrylate, tri(2-acryloxyethyl) isocyanurate, tri(2-methacryloxyethyl) trimellitate, and the like, and combinations thereof.

The tackifier, if present, will be chosen to enhance the tackiness of the outside surface of the article on expansion but not such that the outer surface exhibits tackiness after formation of the article and before expansion, since it is generally desirable that the outer surface of the article should be dry and non-tacky during initial placement of the article in the cavity. Desirably, to enhance the adhesive qualities of the base polymer at the temperature of expansion, the tackifier will have a relatively low molecular weight, no significant crystallinity, a ring-and-ball softening point above at least 50° C. (and preferably higher, near the softening point of the base polymer), and will be compatible with the base polymer and other polymers present. The tackifier may be present in up to 30 parts per 100 parts of base polymer. Suitable tackifiers include novolak resins, partially polymerized rosins, tall oil rosin esters, low molecular weight aromatic thermoplastic resins, Picco® and Piccotac® resins from Hercules Chemical, and the like.

Antioxidants, adhesion promoters, plasticizers, pigments, and the like may also be employed in conventional amounts.

Exemplary formulations include:

| Ingredient | Formulation, parts by weight | | | |
|---|---|---|---|---|
| | A | B | C | D |
| Evatane 28-05 (EVA) | | 100 | | 100 |
| Elvax 470 (EVA) | 100 | | 100 | |
| Irganox 1076 (antioxidant) | 2 | 2 | 2 | 2 |
| Kadox 911 (ZnO) | 30 | 30 | | |
| Huberbrite 7 (BaSO$_4$) | | | 30 | 30 |
| Piccotac 95 (tackifier) | | | | 30 |
| Varox 231 XL (chemical crosslinking agent) | 2.5 | 1.5 | 2.5 | 1.5 |
| Celogen TSH (blowing agent) | | 10 | | 10 |
| Celogen OT (blowing agent) | 10 | | 10 | |
| Sartomer 350 (radiation crosslinking promoter) | 5 | 5 | 5 | 5 |

Of these formulations, formulations A and C are particularly applicable to the manufacture of the sealer portion of a cavity sealing article of this invention, while formulations B and D are applicable to the manufacture of both the driver and sealer portions of a cavity sealing article.

The composition may be prepared by methods conventional in the art of polymer blending, such as by mixing in a high shear mixer such as a Banbury or Brabender type mixer, with care being taken to ensure that the temperature of the blend does not rise to such an extent that the chemical crosslinking agent or blowing agent are activated. Typically, the base polymer, other polymers/tackifier (if present), and antioxidant are added first, and blended to homogeneity. The filler, adhesion promoter, pigments (if present) may be mixed with the base polymer, or may be added after the base polymer has been softened by mixing. These first mixing stages are not particularly temperature-sensitive. Once all ingredients other than the blowing and crosslinking agents have been added and fully blended, however, temperature control becomes important as these last agents are added. Accordingly, the mixer is cooled so that the temperature of the composition does not exceed about 95° C., and more preferably does not exceed about 80° C.; the blowing agent(s), accelerator(s), crosslinking agents, and any plasticizers are added, and the resulting composition is subjected to high shear mixing under controlled temperature conditions until the composition is homogeneous. The composition may then be cooled, for example by processing through a two-roll mill with cooled rollers.

The resulting bulk composition may then be formed into the appropriate shape for the cavity sealing article of this invention by any appropriate means. For example, it may be extruded or rolled into sheets for cutting, extruded into rods of a desired cross-sectional configuration, molded into desired shapes, or pelletized for later molding or extrusion.

The particular composition used to make the cavity sealing article of this invention is not critical; and a person of ordinary skill in the art should have no difficulty, having regard to that skill and this disclosure, including the references cited here, in determining a suitable formulation to prepare a cavity sealing article of this invention or in optimizing such a composition for a particular application.

Manufacture of the Cavity Sealing Article

Although it is within the contemplation of this invention that a single sealing article of this invention may have expansion and sealing properties so that it may be used to seal a range of cavities of different sizes or shapes, more typically a cavity sealing article is formulated and shaped specifically for use in a particular cavity which is intended to be sealed. This is especially true in automobile or other vehicle manufacture, where cavities may be of very different cross-sections, and the quality of the seal is of considerable importance to provide a moisture, sound, and particulate barrier.

The cavity sealing article of this invention, as previously described, comprises a crosslinked driver surrounded by an uncrosslinked sealer, the shape and size of which will be chosen based on the cavity cross-section and the foaming properties of the article. Because the filling of the cavity cross-section is provided primarily by the driver portion of the article, rather than by the sealer portion (which is much softer at the temperature of foaming), the cross-section of the driver portion of the article will desirably be chosen so that, on expansion, the driver portion alone would substantially but not completely fill the cavity cross-section; for example, the expanded driver will have linear dimensions between 40% and 100% of the cavity dimensions, especially between 70% and 95% of the cavity dimensions. Too small a driver may provide insufficient filling of the cavity cross-section for the softer sealer portion to fill the remaining space, while too large a driver may buckle within the cavity when fully expanded thereby potentially damaging the seal. For a driver portion having a volume expansion of 800% (a linear expansion of 200%), then, suitable linear dimensions for the driver may be from 20% to 50%, especially 35% to 45% of the linear dimensions of the cavity; for a driver having a volume expansion of 1200% (a linear expansion of 230%), suitable linear dimensions may be from 18% to 45%, especially 30% to 40%, etc.. Especially if the cavity is of irregular shape, the configuration of the driver portion may be exaggerated in the direction of shape irregularities, especially vertices, in the cross-section of the cavity, to ensure that the sealer portion is driven completely into these irregularities and vertices and the resulting foam completely fills and seals the cavity. This is shown in FIG. 4, where, although the cross-section of the sealing article as a whole is the same as that of the sealing article of FIG. 1, the driver portion 22 of the sealing article 20 comprises exaggerations 22A through 22F in the direction of the vertices of the cavity to assist in filling these vertices. The sealer portion of the article will relatively uniformly surround the driver portion in the cavity cross-section and be of such a size that it provides sufficient sealing (i.e. as yet uncrosslinked) foam during expansion to completely fill all spaces between the driver and the cavity walls and, desirably, adhere to them. The optimal size of the sealer portion will therefore depend on such factors as the volume expansion of the material of the sealer, its extent of expansion, the extent to which the expanded driver portion will fill the cavity, and the like. The resulting article will therefore typically have a cross-section that is comparable in shape to the cavity to be sealed, but between about 45% and 85% of the linear dimensions, typically about 55% to 75% of the linear dimensions, of the cavity.

In a preferred embodiment, the cavity sealing article is manufactured in the form of a flat sheet having a shape corresponding generally to the cross-sectional shape of the cavity to be sealed, but smaller in linear dimension. In such a case, it is particularly convenient to manufacture the article from a foamable polymer composition containing both a chemical crosslinking agent for the sealer and a radiation crosslinking promoter for the driver portions of the article, as previously described. A sheet of foamable polymeric material is simply cut to the final dimensions of the article, or the article is molded to the desired shape from the foamable polymeric material, and the driver portion is selectively crosslinked by masking that portion of the piece which will become the sealer of the article, so that only that portion of the piece that will become the driver of the article is crosslinked. The sealer portion and driver portion of the article may also be cut separately from the same or different sheets of foamable polymeric material, and the resulting driver and sealer assembled into the cavity sealing article of this invention. In this case, the sheet from which the driver is cut may be crosslinked as a sheet before the driver is cut from it, or the driver may be crosslinked after cutting from the sheet. Other methods of manufacturing the cavity sealing article are also possible, such as extruding a rod of the foamable polymeric material of the driver to a cross-section desired for the driver, crosslinking it, subsequently extruding around that rod the foamable polymeric material of the sealer, then sectioning the resulting composite rod into a plurality of cavity sealing articles; coextruding the driver and sealer in the appropriate shapes, sectioning, and crosslinking the driver; molding the driver and sealer either as a unitary piece of the same material or comolding two different materials for the driver and sealer, etc. It is also within the scope of this invention that the sealer may also surround the driver in the direction of the cavity axis as well as in the cavity cross-section, although such embodiments are not shown. A person of ordinary skill in the art will be able, having regard to that skill and this disclosure, to select suitable materials and perform a suitable method of manufacture for a cavity sealing article of this invention.

Use of the Cavity Sealing Article

The cavity sealing article of this invention is used by placement in the cavity to be sealed, preferably approximately centrally in the cavity cross-section and with the cross-section of the article approximately coincident with the cross-section of the cavity. The article may be emplaced in the cavity by such means as are conventional in the art, for example by emplacement through a hole into an already formed cavity or, more usually, by fastening onto one of two or more members which are subsequently fastened together to form the cavity. It is a feature of the cavity sealing article of this invention that, because of the use of the driver and sealer portions of the article to maximize its cavity filling and sealing efficacy, placement of the article in the cavity is not as position-critical as placement of prior art cavity seals. The article may be emplaced by mounting on a stud, screw, or other relatively small support (such as is shown in the previously-mentioned Soderberg patent and illustrated in FIGS. 1, 2, and 4). In some instances, the cavity to be sealed will have a structural part or parts which will support the cavity sealing article in a desired location, particularly if the article has been molded or shaped to a predetermined shape for that location and/or is provided with molded-in features (for example, holes or protrusions) to engage those parts. In other instances, the article may be formed with features, such as protrusions extending from the periphery of the article in cross-section, such that the protrusions engage the cavity to provide correct placement of the article in the predetermined location. This is shown in FIG. 5, where the sealing article 20 is provided with protrusions 24A through 24D shaped to engage the cavity walls. The article may also be provided with clips or the like, about which it has been molded, to engage holes in the cavity walls; or may be provided with holes to engage protrusions, clips, or the like, formed in or attached to the cavity walls. The article may also be emplaced by fastening to a support plate or tray (or between a pair of such support plates or trays, although it is a feature of the cavity sealing article of this invention that extensive support is not necessary), which is in turn fastened to or otherwise firmly located in the cavity, such as is well-known in the art for other foamable cavity seals. This is shown in FIGS. 6 and 7, where the cavity sealing article 20 is fastened to a support plate 40, only the periphery of which is visible behind the article, by a bolt 42 passing through a hole in the driver and the support plate and a nut 44. Here, the support plate 40 has flanges 40A and 40B which engage the cavity walls to position the support plate, and hence the article 20, in the cavity. FIG. 8 shows an arrangement similar to that of FIG. 7, where the sealing article 20 is fastened to the support plate 40 by two plastic expanding anchors 46A and 46B passing through a hole in the driver and the support plate. It will be evident to one of ordinary skill in the art, having regard to that skill and this disclosure that other means may be used to emplace the sealing article of this invention within a cavity to be sealed, and that all such means fall within the scope of this invention.

Because the driver portion of the sealing article of this invention is crosslinked, it does not melt or flow when heated to a temperature above the melting point of the polymers comprising it, although it will soften to a certain extent (depending on the materials, the extent of crosslinking, and the temperature). It is therefore a particular benefit of the sealing article of this invention that the driver portion is relatively dimensionally stable and the article can therefore be emplaced within the cavity to be sealed by a simple support, rather than requiring substantial support to prevent its sagging during heating and foaming (especially when the cross-section to be sealed is vertical and sagging of the article would tend to cause the sealing material to pull away from the cavity wall above the sealing article, as discussed below in Example 3 and Comparative Example 3). For example, the sealing article may be supported only on a single stud or screw (such as is shown in FIGS. 1, 2, and 4), may be effectively self-supporting (such as is shown in FIG. 5), or may be supported on a support plate with a simple fastener such as a nut and bolt (such as is shown in FIGS. 6 and 7) or expanding plastic anchors (such as is shown in FIG. 8). What is more, because the driver foams and expands in use, it is not necessary that the mounting of the sealing article, for example on a support plate such as in FIGS. 6 to 8, be a sealed mounting: the driver will expand to seal tightly to any mounting means (like the bolt or expanding anchors shown) that is used. As a result, the cavity sealing article of this invention does not need expensive, complex, or precise mounting within the cavity to be sealed, but yet will still provide an excellent seal when used.

When the article is emplaced within a cavity of a vehicle, the article is desirably placed such that there is substantially complete clearance around it within the cavity before activation and foaming, thereby permitting the phosphating, rustproofing, electrochemical painting, and other treatments such as are commonly given to vehicle bodies. When the article is emplaced within a cavity that is not subject to painting and the like, such clearance is not necessary.

When it is desired to activate and foam the sealing article of this invention, the article is exposed to a sufficient temperature for a sufficient time to activate the blowing agent and the chemical crosslinking agent. Suitable times and temperatures will depend on the application in which the seal is to be used, and may include temperatures between 100° C. and 300° C. or greater for periods between 5 and 100 minutes. Typically, in the case of sealing channels in new vehicle bodies, this heat activation will occur when the body is placed in a paint bake oven to cure previously applied paint, and such temperatures and times are typically between 115° C. and 250° C. for 10 to 40 minutes, for example 160° C. for 25 minutes, but a person of ordinary skill in the art will realize that other temperatures and times may be appropriate. Also, the sealing article may be activated by other heat sources (for example, local heating such as induction heating of the area), for example if it is being used for repair purposes or is being emplaced in a large structure. On heating, the uncrosslinked sealer portion of the article softens and foams while the crosslinked driver portion of the article foams in a uniform fashion to push the sealer into intimate sealing contact with the walls of the cavity. The foam of the sealer portion is then chemically crosslinked, stabilizing the sealer foam so that the insert forms a stable plug filling the whole cross-section of the cavity and intimately bonded to the cavity walls, acting as a moisture, sound, and particulate barrier.

The invention is illustrated by the following Examples and Comparative Examples.

EXAMPLE 1

A foamable sheet was prepared from the following formulation:

| Ingredient | Parts by weight |
|---|---|
| Evatane 28-05 (EVA, 28% VA, MFI 5, Atochem) | 100.0 |
| Irganox 1076 (antioxidant, Ciba-Geigy) | 2.0 |
| Kadox 911 (zinc oxide) | 30.0 |
| Varox 231 XL (peroxide crosslinker, Vanderbilt) | 1.5 |
| Celogen TSH (blowing agent, Uniroyal) | 10.0 |
| Sartomer 350 (radiation crosslinking promoter, Sartomer) | 5.0 |

A Brabender mixer was set at 80° C.; and the Evatane, Irganox, and Kadox were added and blended to homogeneity. The Varox, Celogen, and Sartomer were then added and blended to homogeneity, ensuring that the temperature of the mixer remained below 80° C. during the mixing process. The mixed material was then molded, at about 100° C. (below the decomposition temperature of the Varox and Celogen), into a sheet of approximately 6 mm thickness.

A test cavity was formed from a section of metal raingutter, of irregular but approximately trapezoidal cross-section, approximately 105 mm on the longer of the parallel sides (across the top of the gutter, which was closed with a piece of sheet metal), 70 mm across the shorter of the parallel sides (the bottom), and 75 mm high. The interior of the test cavity was sprayed with light oil (WD-40®) to simulate contamination of the cavity and provide a more stringent test of the sealing power of the cavity sealing article.

A piece of the foamable sheet prepared as described above was cut to approximately the shape of the test cavity, with linear dimensions approximately 65%–85% of those of the cavity. The piece was a trapezoid, with the longer of the parallel sides being 90 mm, the shorter being 47 mm, and the height being 51 mm. The piece was held in an acrylate jig, with an acrylate mask of approximately 13 mm thickness placed on top of the piece, masking an approximately 13 mm wide strip (forming the sealer portion of the cavity sealing article) around the edge of the piece and leaving an exposed area also of trapezoidal shape, with the longer of the parallel sides being 45 mm, the shorter being 29 mm, and the height being 25 mm, forming the driver portion. The resulting assembly was irradiated with 1.6 Mrad of 3.0 MeV electrons to crosslink the exposed section of the piece (the driver), thereby producing a cavity sealing article of this invention.

The test cavity was placed on a metal sheet so that its axis was vertical and cross-section horizontal, and the cavity sealing article was placed on the metal sheet, in approximately the center of the cavity. The resulting assembly was placed in a 157° C. oven for 25 minutes, then removed and allowed to cool.

Examination of the test cavity revealed that the crosslinked driver portion of the article had foamed and expanded isotropically, forming a uniform foam with small closed cells. This foam had forced the uncrosslinked sealer portion at the periphery of the article into close proximity with the walls of the test cavity. The sealer of the article had also foamed, although in a less uniform fashion and with open cells visible on the surface, but, with the driver, had completely filled the test cavity cross-section and displayed excellent adhesion to the cavity walls.

The resulting foamed article was non-tacky and non-moisture absorbing, and effectively sealed the cavity.

Square test pieces of the material of the sealing article of this Example, either crosslinked (like the driver) or uncrosslinked (like the sealer), were foamed for an identical temperature and time, laid horizontally on a metal sheet but not otherwise externally confined. The crosslinked material expanded isotropically with a volume expansion of 800% (linear expansion of 200% in each direction), giving a uniform foam of small cell size. The uncrosslinked material expanded anisotropically with a volume expansion of approximately 600% (linear expansion of approximately 180% in the two horizontal directions and non-uniform vertical expansion of approximately 265% in the center and 100% at the edges), giving a coarse cell structure.

COMPARATIVE EXAMPLE 1

Cavity sealing articles not of this invention but similar to that of Example 1 were prepared as follows: without a radiation crosslinking promoter or crosslinking (i.e. lacking a driver); and with the same formulation as in Example 1, but radiation crosslinked uniformly across its entire area (i.e. lacking a sealer).

These articles were tested in the same manner as the cavity sealing article of Example 1, i.e. placing them horizontally in a test cavity and foaming them in an oven. The non-crosslinked article foamed preferentially in the vertical direction, probably due to adhesion to its support, and did not fill the cross-section of the test cavity; however, adhesion of the foam to the cavity walls was good. The uniformly crosslinked article foamed isotropically; however, it did not adhere to the cavity walls and buckled where it came into contact with them, so that it also did not fill the cross-section of the test cavity.

These results, taken with the results of Example 1, show that a cavity sealing article of this invention with a crosslinked driver and uncrosslinked sealer functions well to seal a cavity, whereas similar articles lacking either the driver or sealer do not function to seal a cavity.

EXAMPLE 2

A cavity sealing article of this invention similar to that used in Example 1 was prepared from a formulation similar to that of Example 1 but containing an additional 30 parts by weight Piccotac 95 (tackifier, Hercules Chemical Co.). The article was tested in the manner described in Example 1. The sealer portion of this article flowed to a greater extent on foaming than the sealer of the article of Example 1; but the article showed the same uniform expansion of the driver, filling of the cavity cross-section, and excellent sealing to the cavity walls that was shown by the article of Example 1.

The resulting foamed article was non-tacky and non-moisture absorbing, and effectively sealed the cavity.

EXAMPLE 3

A cavity sealing article of this invention, and a test cavity, were prepared as in Example 1. The article was adhered by a piece of double-sided adhesive tape to a sheet metal support plate, having a shape and size similar to that of the article, with flanges at the corners of the plate so that the plate (and hence the article) was supported centrally in the cavity. The resulting assembly was placed in the oven with the axis of the cavity horizontal (the article, and the cavity cross-section, therefore being vertical), and was heated at 157° C. for 25 minutes to foam the article.

Examination of the test cavity revealed that the crosslinked driver portion of the article had foamed and expanded isotropically, forming a uniform foam with small closed cells. This foam had forced the uncrosslinked sealer portion at the periphery of the article into close proximity with the walls of the test cavity. The sealer of the article had also foamed, although in a less uniform fashion and with open cells visible on the surface, but, with the driver, had completely filled the test cavity cross-section and displayed excellent adhesion to the cavity walls.

The resulting foamed article was non-tacky and non-moisture absorbing, and effectively sealed the cavity.

COMPARATIVE EXAMPLE 3

A cavity sealing article not of this invention but similar to that of Example 1 was prepared by manufacturing the article using the same procedure as in Example 1 but not radiation crosslinking the center area, so that the article lacked a driver. The article was tested in the same manner as the cavity sealing article of Example 3, i.e. placing it vertically in a test cavity and foaming it in an oven. The article foamed preferentially in the horizontal direction, sagged badly away from the upper part of the cavity walls, and did not fill the cross-section of the test cavity; however, adhesion of the foam to the cavity walls was good.

These results, taken with the results of Example 3, show that a cavity sealing article of this invention with a crosslinked driver and uncrosslinked sealer functions well to seal a cavity, whereas a similar article lacking the driver does not function to seal a cavity.

While this invention has been described in conjunction with specific embodiments and examples, it will be evident to one of ordinary skill in the art, having regard to this disclosure, that equivalents of the specifically disclosed materials and techniques will also be applicable to this invention; and such equivalents are intended to be included within the following claims.

What is claimed is:

1. A method of sealing a longitudinally extending cavity defined by cavity walls, the cavity having a cross-section within the cavity walls which is to be sealed at a predetermined location, the method comprising:
    (a) providing a cavity sealing article comprising:
        (i) a driver comprising a crosslinked foamable polymer, the driver having a size, shape, and expansion ratio on foaming such that, when foamed within the cross-section of the cavity at the predetermined location, it substantially but incompletely occupies the cross-section of the cavity; and
        (ii) a sealer comprising an uncrosslinked foamable polymer in intimate contact with the driver and surrounding the driver in the cross-section of the cavity, the sealer having a size, shape, and expansion ratio on foaming such that, when the cavity sealing article as a whole is foamed, the foamed sealer is forced into intimate and sealing contact with the cavity walls;
    (b) placing the article within the cross-section of the cavity at the predetermined location, such that the sealer is disposed between the driver and the cavity walls; and
    (c) heating the article for a sufficient time and to a sufficient temperature such that the driver expands to substantially but incompletely occupy the cross-section of the cavity and the foamed sealer is forced into intimate and sealing contact with the cavity walls.

2. The method of claim 1 where the cavity is a cavity within a unibody frame of an automobile, and the step of heating comprises baking the frame of the automobile in a paint bake oven.

3. A method according to claim 1, wherein the crosslinked foamable polymer of the driver and the uncrosslinked foamable polymer of the sealer are made of the same base polymer.

4. A method according to claim 3, wherein the crosslinked foamable polymer of the driver is a radiation crosslinked foamable polymer.

5. A method according to claim 4, wherein the driver and the sealer are formed from a single piece of foamable polymer that has been selectively irradiated to form the driver.

6. A method according to claim 1, wherein the driver and the sealer are formed from two separate pieces of foamable polymer.

7. A method according to claim 1, wherein the cavity sealing article comprises a flat sheet extended in the cross-section of the cavity.

8. A method according to claim 7, wherein the cavity sealing article has a thickness between 3 mm and 13 mm.

9. A method according to claim 1, wherein the cavity sealing article has a cross-sectional shape corresponding generally to the cross-section of the cavity.

10. A method according to claim 9, wherein the cavity sealing article has linear dimensions that are between 45% and 85% of the linear dimensions of the cross-section of the cavity.

11. A method according to claim 1, wherein the cavity sealing article is placed within the cross-section of the cavity such that there is substantially complete clearance around the cavity sealing article.

12. A method according to claim 11, wherein the crosslinked foamable polymer of the driver and the uncrosslinked foamable polymer of the sealer are made of the same base polymer.

13. A method according to claim 12, wherein the crosslinked foamable polymer of the driver is a radiation crosslinked foamable polymer.

14. A method according to claim 13, wherein the driver and the sealer are formed from a single piece of foamable polymer that has been selectively irradiated to form the driver.

15. A method according to claim 11, wherein the driver and the sealer are formed from two separate pieces of foamable polymer.

16. A method according to claim 11, wherein the cavity sealing article comprises a flat sheet extended in the cross-section of the cavity.

17. A method according to claim 16, wherein the cavity sealing article has a thickness between 3 mm and 13 mm.

18. A method according to claim 11, wherein the cavity sealing article has a cross-sectional shape corresponding generally to the cross-section of the cavity.

19. A method according to claim 17, wherein the cavity sealing article has linear dimensions that are between 45% and 85% of the linear dimensions of the cross-section of the cavity.

* * * * *